United States Patent
Vilke et al.

(10) Patent No.: US 11,016,792 B1
(45) Date of Patent: May 25, 2021

(54) REMOTE SEAMLESS WINDOWS

(71) Applicant: Amazon Technologies, Inc., Seattle, WA (US)

(72) Inventors: Stephen Daniel Vilke, Bainbridge Island, WA (US); Jose Miguel Resendiz Castillo, Seattle, WA (US); Austin Garbelman, Renton, WA (US); Jeff David Rosenfeld, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/295,965

(22) Filed: Mar. 7, 2019

(51) Int. Cl.
| | |
|---|---|
| *G06F 15/16* | (2006.01) |
| *G06F 9/451* | (2018.01) |
| *G06F 9/455* | (2018.01) |
| *G06F 3/0483* | (2013.01) |
| *H04L 29/06* | (2006.01) |

(52) U.S. Cl.
CPC .......... *G06F 9/452* (2018.02); *G06F 3/0483* (2013.01); *G06F 9/45558* (2013.01); *H04L 67/38* (2013.01); *G06F 2009/45562* (2013.01); *G06F 2009/45591* (2013.01); *G06F 2009/45595* (2013.01)

(58) Field of Classification Search
CPC . G06F 9/54; G06F 9/452; G06F 9/455; G06F 9/45558; G06F 3/0483; G06F 2009/45562; G06F 2009/45591; G06F 2009/45595; H04L 67/38
USPC ........................................................ 709/217
See application file for complete search history.

(56) References Cited

U.S. PATENT DOCUMENTS

| | | | |
|---|---|---|---|
| 7,516,255 B1 | 4/2009 | Hobbs | |
| 7,573,886 B1 | 8/2009 | Ono | |
| 8,144,255 B2 | 3/2012 | Hirayama et al. | |
| 9,172,740 B1 * | 10/2015 | Jia | G09G 5/393 |
| 9,311,692 B1 * | 4/2016 | Jia | G06T 3/4092 |
| 9,401,128 B1 | 7/2016 | Jepsen | |
| 9,620,041 B2 | 4/2017 | Liu | |
| 9,762,636 B2 | 9/2017 | Price | |
| 10,264,070 B2 | 4/2019 | Bradley et al. | |
| 10,331,394 B1 * | 6/2019 | Sarfi | G06F 9/452 |
| 10,346,715 B2 | 7/2019 | Makarewicz et al. | |
| 10,404,963 B1 | 9/2019 | Kenrick | |
| 10,735,650 B2 | 8/2020 | Kinoshita | |
| 2001/0036308 A1 | 11/2001 | Katayama et al. | |
| 2003/0088421 A1 | 5/2003 | Maes et al. | |
| 2004/0154460 A1 | 8/2004 | Virolainen et al. | |

(Continued)

OTHER PUBLICATIONS

U.S. Appl. No. 16/219,865, filed on Dec. 13, 2018.

(Continued)

*Primary Examiner* — Ruolei Zong
(74) *Attorney, Agent, or Firm* — Davis Wright Tremaine LLP

(57) ABSTRACT

A system for providing access to remotely hosted applications obtains information indicative of the resolution of a client desktop and an arrangement of windows on the client desktop. A host of the applications is made to conform its desktop resolution and arrangement of windows to that of the client desktop, such that the occluded window portions correspond between the client and host. Visible content of the hosted application windows is tracked and streamed to the client.

20 Claims, 6 Drawing Sheets

(56) References Cited

U.S. PATENT DOCUMENTS

| | | |
|---|---|---|
| 2007/0110074 A1 | 5/2007 | Bradley et al. |
| 2008/0024599 A1 | 1/2008 | Hirakawa |
| 2008/0052414 A1 | 2/2008 | Panigrahi et al. |
| 2008/0137755 A1 | 6/2008 | Onur et al. |
| 2008/0198930 A1 | 8/2008 | Matsubayashi |
| 2008/0198931 A1 | 8/2008 | Chappalli et al. |
| 2008/0278445 A1 | 11/2008 | Sweetser et al. |
| 2009/0100493 A1 | 4/2009 | Jones et al. |
| 2009/0210817 A1 | 8/2009 | Schmieder et al. |
| 2009/0241110 A1* | 9/2009 | Heo ............... G06F 9/45537 718/1 |
| 2009/0284442 A1 | 11/2009 | Pagan |
| 2009/0285217 A1 | 11/2009 | Frink et al. |
| 2010/0045690 A1 | 2/2010 | Handschy et al. |
| 2010/0046623 A1 | 2/2010 | Chen et al. |
| 2010/0091042 A1 | 4/2010 | Inoue |
| 2010/0128054 A1 | 5/2010 | Manabe |
| 2010/0164839 A1* | 7/2010 | Lyons ............... G06F 3/1454 345/2.3 |
| 2010/0231738 A1 | 9/2010 | Border et al. |
| 2010/0231800 A1 | 9/2010 | White et al. |
| 2010/0256344 A1 | 10/2010 | Thompson et al. |
| 2011/0043806 A1 | 2/2011 | Guetta et al. |
| 2011/0141372 A1 | 6/2011 | Kato et al. |
| 2011/0209064 A1* | 8/2011 | Jorgensen ............... G06F 9/452 715/733 |
| 2011/0228984 A1 | 9/2011 | Papke et al. |
| 2011/0231419 A1 | 9/2011 | Papke et al. |
| 2012/0226742 A1* | 9/2012 | Momchilov ............ G06F 3/0481 709/203 |
| 2012/0314599 A1 | 12/2012 | Vilke et al. |
| 2012/0324365 A1* | 12/2012 | Momchilov ............ G06F 9/54 715/738 |
| 2013/0033618 A1 | 2/2013 | Kato et al. |
| 2013/0044885 A1 | 2/2013 | Master et al. |
| 2013/0055102 A1* | 2/2013 | Matthews ............ G06F 9/44505 715/740 |
| 2013/0064289 A1 | 3/2013 | Chernyshev et al. |
| 2013/0185633 A1 | 7/2013 | Bunker et al. |
| 2013/0215290 A1 | 8/2013 | Solhusvik et al. |
| 2013/0219012 A1 | 8/2013 | Suresh et al. |
| 2014/0043349 A1 | 2/2014 | Parmar et al. |
| 2014/0188977 A1* | 7/2014 | Song ............... H04L 67/10 709/203 |
| 2014/0244863 A1 | 8/2014 | Bradley et al. |
| 2014/0282753 A1 | 9/2014 | Li et al. |
| 2014/0359494 A1 | 12/2014 | Clark |
| 2015/0117545 A1 | 4/2015 | Fu et al. |
| 2015/0125032 A1 | 5/2015 | Yamanaka et al. |
| 2015/0215753 A1 | 7/2015 | Leipzig et al. |
| 2015/0244812 A1* | 8/2015 | Brunson ............... G06F 9/452 709/203 |
| 2015/0244940 A1 | 8/2015 | Lombardi et al. |
| 2015/0254726 A1 | 9/2015 | Cassidy et al. |
| 2015/0350555 A1 | 12/2015 | Nishi |
| 2016/0127432 A1 | 5/2016 | Privat |
| 2016/0133224 A1 | 5/2016 | Nakajima |
| 2016/0189393 A1 | 6/2016 | Rao et al. |
| 2016/0218986 A1 | 7/2016 | Klemetti et al. |
| 2016/0219218 A1 | 7/2016 | Kinoshita |
| 2016/0246560 A1* | 8/2016 | Petrov ............... G06F 9/452 |
| 2017/0034542 A1 | 2/2017 | Yabu |
| 2017/0054793 A1* | 2/2017 | Urbach ............... H04L 69/03 |
| 2017/0104909 A1 | 4/2017 | Nakajima |
| 2017/0141906 A1 | 5/2017 | Rainish |
| 2017/0150045 A1 | 5/2017 | Goswami et al. |
| 2017/0256281 A1 | 9/2017 | Hoarty |
| 2017/0279757 A1 | 9/2017 | Kereth et al. |
| 2017/0365237 A1 | 12/2017 | Koneru et al. |
| 2018/0027167 A1 | 1/2018 | He et al. |
| 2018/0054481 A1 | 2/2018 | Bradley et al. |
| 2018/0158424 A1 | 6/2018 | Okamoto et al. |
| 2018/0242920 A1 | 8/2018 | Hresko et al. |
| 2018/0332132 A1 | 11/2018 | Sampath et al. |
| 2019/0012531 A1 | 1/2019 | Radwin et al. |
| 2019/0141351 A1 | 5/2019 | Alakuijala et al. |
| 2019/0156785 A1 | 5/2019 | Marchya et al. |
| 2019/0281206 A1 | 9/2019 | Lee et al. |
| 2019/0302881 A1 | 10/2019 | Chan et al. |
| 2020/0059643 A1 | 2/2020 | Marchya et al. |
| 2020/0257807 A1 | 8/2020 | Chen |

OTHER PUBLICATIONS

U.S. Appl. No. 16/369,628, filed on Mar. 29, 2019.
U.S. Appl. No. 16/217,653, filed on Dec. 12, 2018.
U.S. Appl. No. 16/217,618, filed on Dec. 12, 2018.
U.S. Appl. No. 16/369,692, filed on Mar. 29, 2019.
U.S. Appl. No. 16/369,597, filed on Mar. 29, 2019.
U.S. Appl. No. 16/369,642, filed on Mar. 29, 2019.
International Search Report and Written Opinion, dated Feb. 26, 2020, in International Patent Application No. PCT/US2019/066070, filed Dec. 12, 2019.
International Search Report and Written Opinion, dated Feb. 26, 2020, in International Patent Application No. PCT/US2019/066072, filed Dec. 12, 2019.
Wikipedia, "IEEE 802.11," page last modified Feb. 7, 2017, retrieved Feb. 13, 2017, from https://en.wikipedia.org/wiki/IEEE_802.11, 9 pages.
Wikipedia, "IEEE 802.16," page last modified Nov. 21, 2016, retrieved Feb. 13, 2017, from https://en.wikipedia.org/wiki/IEEE_802.16, 8 pages.
Wikipedia, "IEEE 802.21," page last modified Aug. 4, 2016, retrieved Feb. 13, 2017, from https://en.wikipedia.org/wiki/IEEE_802.21, 3 pages.
IEEE 100, "The Authoritative Dictionary of IEEE Standards Terms," Seventh Edition, IEEE Standards Information Network, IEEE Press, Dec. 2000, 3 pages (pertinent p. 452).

* cited by examiner

REMOTE SEAMLESS WINDOWS

CROSS-REFERENCE TO RELATED APPLICATIONS

This application incorporates by reference for all purposes the full disclosures of related U.S. patent application Ser. No. 16/219,865, filed on Dec. 13, 2018, entitled "CONTINUOUS CALIBRATION OF NETWORK METRICS," related U.S. patent application Ser. No. 16/217,653, filed on Dec. 12, 2018, entitled "METHOD TO DETERMINE THE FPS ON A CLIENT WITHOUT INSTRUMENTING RENDERING LAYER," and related U.S. patent application Ser. No. 16/217,618, filed on Dec. 12, 2018, entitled "TECHNIQUES FOR LOSS MITIGATION OF AUDIO STREAMS."

BACKGROUND

There are many types of computers and computing environments. Different types of computer systems can be configured with different types of hardware and software. Many combinations of hardware and software may be assembled to provide for different types of uses. For example, a computer server may be configured with a particular type of processor supporting a particular instruction set (e.g., x86 or ARM) and a corresponding operating system that is supported by the processor. Applications may be written, generated, installed, and executed on different types of operating systems.

Remote desktop solutions have been devised to allow a client computer system to run an application via a host computer system. For example, the client computer system may have a configuration (e.g., processor architecture, operating system) that is not amenable to running a software application but the host computer system is able to run the application. The client computer system may run a virtual application solution in which the client computer system and the host computer system coordinate so that it appears that the client computer system is running the application when the application is actually being executed by or with the assistance of the host computer system. However, there are many challenges involved with remote desktop solutions, including but not limited to bandwidth constraints, as well as the coordination, management, and coordination of application state between the client and host. Additionally, managing multiple virtual applications may present challenges around the use of multiple frame buffers to capture virtual application information for the client.

BRIEF DESCRIPTION OF THE DRAWINGS

Various techniques will be described with reference to the drawings, in which.

DETAILED DESCRIPTION

Figure 1:
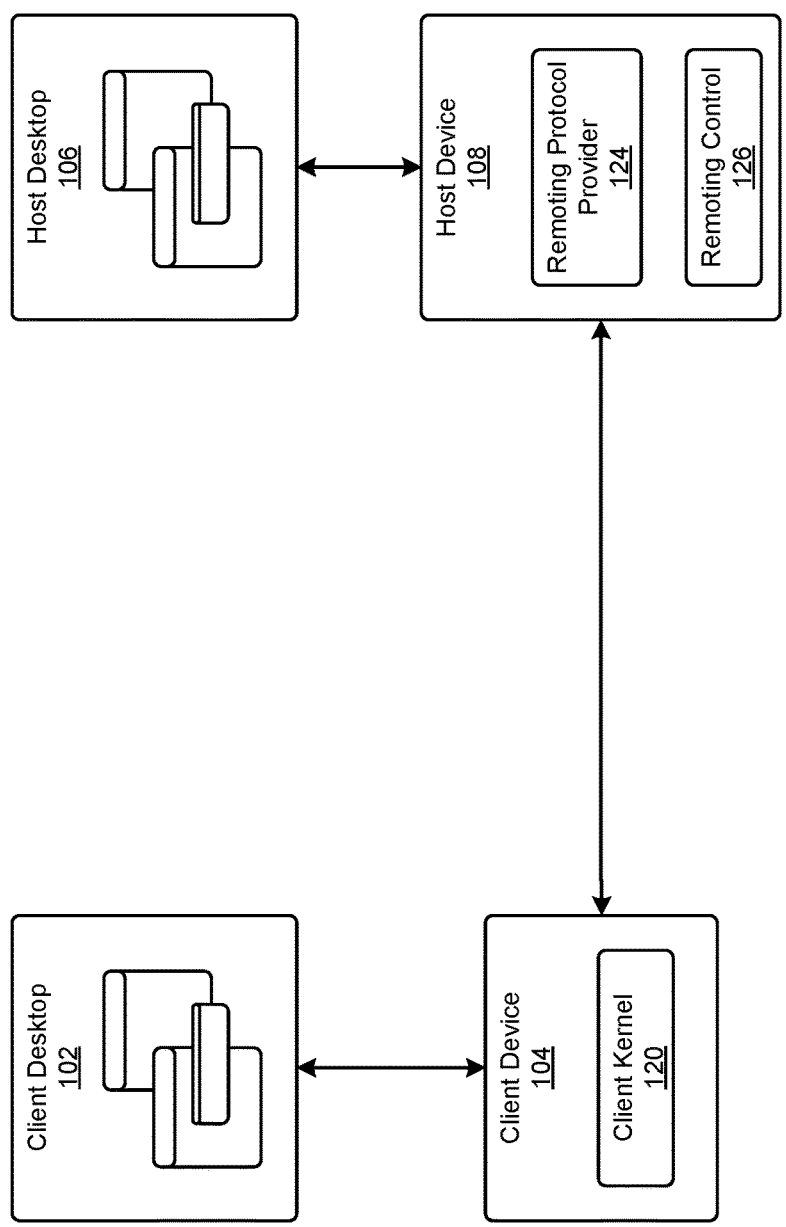
FIG. 1 illustrates an example application window remoting system, in accordance with an embodiment.

This disclosure relates to the remote hosting of applications. In an example embodiment, a number of hosted applications are displayed on a client device using seamless windows. Here, seamless refers to the hosted windows being integrated into the client's desktop in the same manner as applications which are executed directly on the client. Thus, rather than being displayed in a recreation of the host's desktop on the client, a seamless window appears to be an ordinary window whose underlying application code happens to be executing on a remote host. Seamless windows have a number of advantages. However, one disadvantage of seamless windows is that they may require the host to maintain a separate frame buffer for each window that is displayed in a seamless mode.

In this example embodiment, seamless windowing is supported without maintaining a separate frame buffer for each window. An interactive streaming protocol maintains conformance between the arrangement of windows on a desktop of a host device and the arrangement of corresponding windows on a desktop of a client device. Herein maintaining conformance refers at least in part to ensuring that the occluded portions of the host desktop windows are the same as (or alternatively, a subset of) the occluded portions of the corresponding windows on the client desktop. Content generated for multiple windows is stored in a single frame buffer. If any of these windows overlap, information corresponding to the occluded regions of the windows will be omitted from the frame buffer.

In this example embodiment, the contents of each window is streamed individually to the client. For a given window, content for the non-occluded portion is obtained from the frame buffer, and placeholder content generated to represent the occluded portions of the windows. The placeholder content may be described as being artificial, since it will generally not be representative of what the content would be if the same portion were not occluded. Nevertheless, due at least in part to the coordination of the desktop arrangements, the occluded portions of the windows are not displayed on the client. Coordinating the desktop arrangements may also be described as synchronizing, aligning, reflecting, or mirroring the arrangements of windows on the respective desktops. Coordinating the desktop arrangements may, in some cases, permit the desktop protocol to operate without being explicitly made aware that data for the occluded portions is missing. Each window may be displayed in seamless mode as if it were being generated and streamed independently, even though only a single frame buffer and desktop session is being used to host the plurality of windows and corresponding applications.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments may improve efficiency of hosting remoted applications, by the reduced use of frame buffers. Embodiments may improve the efficiency of streaming remoted application window content, by reduction of the amount of data transmitted. Further, embodiments may provide improved real or perceived responsiveness to commands input by the user of a remoted application.

FIG. 1 illustrates an example application window remoting system, in accordance with an embodiment. In the example remoting system 100, a client device 104 receives streamed application windows from a host device 108.

Figure 6:
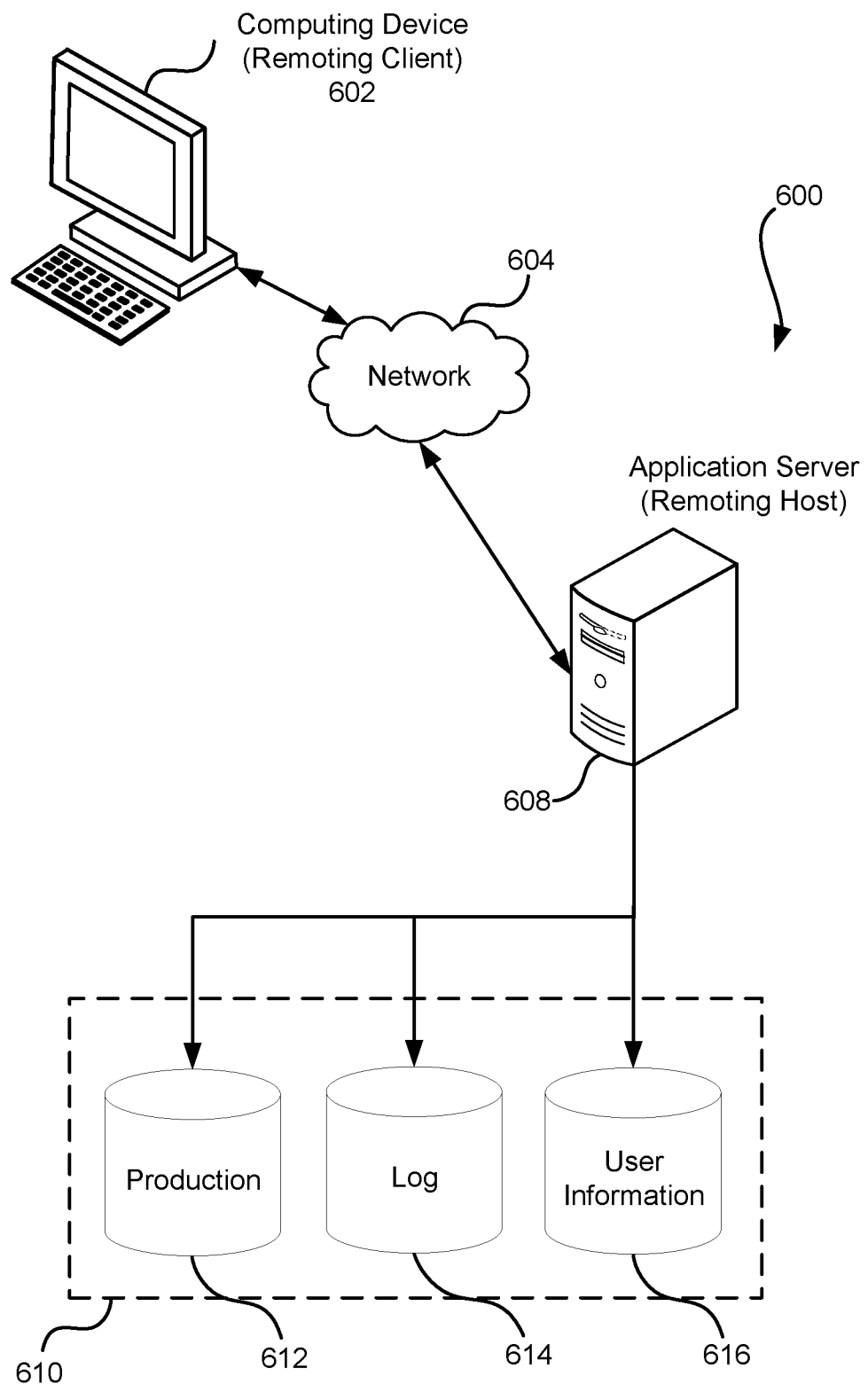
FIG. 6 illustrates a system in which various embodiments can be implemented.

In various embodiments, the client device 104 is a computing device, such as the client computing device 602 depicted in FIG. 6. The client device 104, in embodiments, comprises at least one processor and a non-transitory memory, on which processor-executable instructions are stored. The client device 104 may comprise an operating system that includes support for various windowing functions. These functions may include support for creating windows, minimizing and maximizing windows, resizing windows, and closing windows. The client device 104 may further include support for receiving application content from a host device, and displaying this content within a window.

Application content, which may also be referred to as window content, or simply as content, refers at least to graphical elements located within the frame of a window. In the case of a remoted application, this content is generated by the host device 108 and sent to the client device 104 for display within a window.

The client device 104 maintains a client desktop 102. In various embodiments, a user of the client device 104 interacts with applications via application windows displayed on the client desktop 102. Certain of the windows displayed on the client desktop 102 may correspond to applications which execute on the host device 108. Content from these applications is streamed from the host device 108 to the client device 104. Likewise, commands or other input for an application may be initially received by the client device 104 and then sent to the host device 108 for processing by the corresponding application.

An application window refers to a graphical element through which information may be displayed or through which information may be collected. An application window may also be referred to as a window, control, user-interface component, user-interface element, or other similar terminology.

In the context of the client desktop 102, an application window may be displayed to a user via display of the client desktop 102 on a screen visible to the user. The application window may receive input from the user via the user's interaction with the client desktop 102. Examples of such input include mouse clicks, keyboard input, voice commands, and so forth. For a hosted application, this input can be collected by the client device 104 and sent to the host device 108 for processing by a corresponding application program. The application program, in response to this input, can update the content of an application window.

At the host desktop 106, an application window is not directly displayed to a user. Rather, in this content, "displaying" a window on the desktop typically refers to storing the window and its content in a buffer representative of the host desktop 106. The display of an application window therefore refers, in relation to the host, to the storing or generation of the application window in such a buffer. The buffer for a host desktop 106 may sometimes be referred to as a frame buffer.

The client device 104 is configured to display various windows on the client desktop 102. These windows may be associated with applications executing on the host device 108. These windows may be described as hosted windows, remotely hosted windows, streamed content windows, streamed windows, and so forth.

In an embodiment, the client device 104 is further configured to display hosted windows in a seamless mode. This mode of display refers to the hosted windows being displayed independently of the host desktop 106. It will be appreciated that, in non-seamless modes of operation, the client device 104 displays a more or less complete representation of the host desktop 106 within some other window displayed on the client desktop 102. In a seamless mode, each window is displayed independently on the client desktop 102, rather than in a window which reproduces the entire hosted desktop.

In an embodiment, the client device 104 comprises a client kernel 120. The client kernel 120 may be a module that manages aspects of managing and displaying applications which are streamed from the host device 108 to the client device 104. As used herein, a module refers to processor-executable instructions that, in response to being executed by at least one processor of a computing device, cause the computing device to perform the various functions attributed to the module.

In an embodiment, the client kernel 120 monitors the resolution of the client desktop 102. The resolution of the desktop pertains to the windowing system, rather than to other aspects of resolution, although in many operating systems these are equivalent.

In an embodiment, the client kernel 120 monitors the arrangement of windows displayed on the client desktop, including windows associated with remote applications. Here, the arrangement of windows refers to aspects such as the size, geometry, position, and stack order of the windows. The monitored information may include sufficient information to recreate the same arrangement on the host desktop 106. Size refers to the dimensions of a window, such as the width and length of a rectangular window. Geometry refers to the shape of the window, such as rectangular, circular, polygonal, and so forth. Position refers to its location on the desktop. Stack order, sometimes referred to as stack position, layering, z-order, and so forth, refers to how the window overlaps with other windows. For example, a window that is at the top of the stack occludes overlapping portions of any other window in the stack, while a window at the bottom of the stack is occluding by the overlapping portions of all other windows in the stack.

In an embodiment, the client kernel 120 transmits the resolution and arrangement information to the host device 108, to cause the host device 108 to recreate the same arrangement of windows as the host desktop 106.

In an embodiment, the client kernel 120 sends instructions to the host device 108 that cause the host device 108 to conform the resolution of the host desktop 106 to the resolution of the client desktop 102, and to conform the arrangement of windows displayed on the host desktop 106 to the arrangement of windows displayed on the client desktop 102.

The client kernel 120, in an embodiment, establishes a remote desktop protocol between the client device 104 and the host device 108. A remote desktop protocol, which might also be described as a remote window protocol or remoting protocol, comprises data formats and related methods for communicating information about the display and operation of a remote window. A remote desktop protocol may also include, in some embodiments, an application programming interface for performing various operations related to the remoting of an application window.

The host device 108, in embodiments, comprises a remoting protocol provider 124 and a remoting control 126. The remoting protocol provider 124 and remoting control 126 collectively manage the provision of streamed application content to the client device 104.

The remoting protocol provider 124, in an embodiment, is a module for implementing the remote desktop protocol on the host device 108. The remoting protocol provider 124 may, for example, receive various commands and data related to remoting, such as input provided by the user of the client device 104. The remoting protocol provider 124 may also, for example, transmit the graphical content of the windows to the client device 104, for display on the client desktop 102.

The remoting control 126, in an embodiment, is a module for conforming the resolution of the host desktop 106 to that of the client desktop 102, and for conforming the arrangement of windows displayed by the host desktop 106 to that of the windows displayed by the client desktop 102. For example, in some cases the remoting control 126 may receive information indicative of the resolution of the desktop 102 make operating system calls to cause the host device 108 to adjust the size of the host desktop 106 so that it equals that of the client desktop 102. Similarly, the remoting control 126 may receive information concerning the arrangement of windows on the client desktop 102, and make various calls (such as calls to the API of the operating system, or by interaction with the corresponding applications) to cause the arrangement of the windows displayed on the host desktop 106 to conform to the arrangement of windows on the client desktop 102.

The host device 108, in embodiments, generates the content of the windows according to the determined arrangement, including position, size, geometry, and stack order. This may be accomplished, in various embodiments, by causing the relative sizes of the client and host to be coordinated, and setting the size, position, and stack order of each window via operating system or application interfaces. The applications may then execute normally, though further coordination of the size, position, stack order and so forth may be needed if the windows are moved, resized, activated, minimized, or otherwise reconfigured. More generally, the arrangement of the windows is kept coordinated between the client desktop 102 and the host desktop 106, by communication of the relevant parameters between the client device 104 and host device 108, and the manipulation of the window arrangement on the client desktop 102 and the host desktop 106. Typically, the arrangement of the windows on the host desktop 106 is updated whenever the position of a window is manipulated by the user of the client device 104 on the client desktop 102, or the window is activated or minimized. Likewise, the arrangement of the windows on the client desktop 102 is updated when the operation of an application (such as the opening or closing of a window) changes the layout of windows on the host desktop 106.

Figure 2:
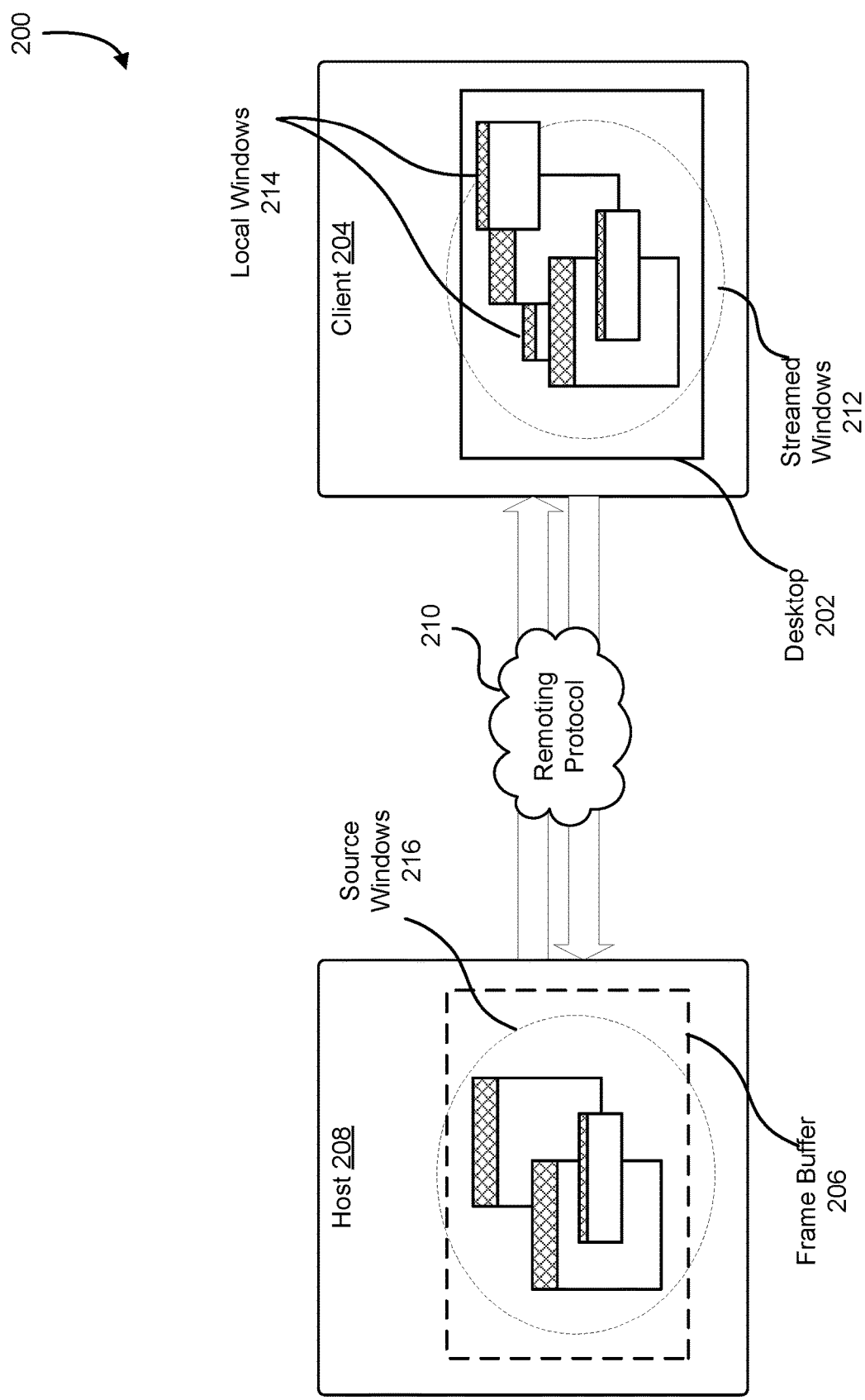
FIG. 2 illustrates an example of remoting application windows, in accordance with an embodiment.

FIG. 2 illustrates an example of remoting application windows, in accordance with an embodiment. In the example 200 of FIG. 2, application programs are executed on a host 208 and the contents of the windows of those applications is streamed to a client 204. The windows of the applications executing on the host 208 may be described as source windows 216. The source windows 216 generate content that is streamed, via a remoting protocol 210, to the client 204.

The source windows 216 may be generated in a single frame buffer 206. The frame buffer 206 can correspond to the desktop of the host 208. However, in contrast to other techniques, the content of the windows may be streamed using a protocol 210, which may be a single-window or multiple-window remoting protocols.

Here, a single-window remoting protocol refers to a remoting protocol which is designed or optimized for scenarios in which a session of the protocol is dedicated to a particular window. A disadvantage of single-window protocols is that they generally require a dedicated frame buffer for each window. A multi-window remoting protocol, in contrast, is a remoting protocol that is designed for or optimized for scenarios in which a session of the protocol is associated with a desktop, rather than a single window. A disadvantage of multi-window protocols is that they generally do not support seamless windows. Note that, in various instances, a single protocol may provide a mode of interaction that corresponds to the aforementioned single-window protocol, and a mode of interaction that corresponds to the aforementioned multi-window protocol.

In contrast to these disadvantages, embodiments described herein my support seamless windows while also utilizing a single frame buffer, and may also be compatible with both single-window and multi-window protocols.

In the example 200 of FIG. 2, the client 204 displays within a desktop 202 a collection of streamed windows 212, as well as one or more additional non-streamed windows, depicted in FIG. 2 as local windows 214. It should be noted that the size, position, and stack order of the streamed windows 212 corresponds exactly to the size, position, and stack order of the source windows 216 in the frame buffer 206. However, in embodiments, local windows may be positioned in front of, behind, or in between the streamed windows 212, provided that the stack order of each of the streamed windows 212 is maintained relative to the other streamed windows 212. In embodiments, there may be some restrictions on where a local window may be placed. For example, in embodiments, a local window can be in front of or behind the streamed windows 212, but cannot be in between any two of the streamed windows 212. This correspondence is maintained, in various embodiments, by an interactive streaming protocol between the client 204 and host 208.

Figure 3:
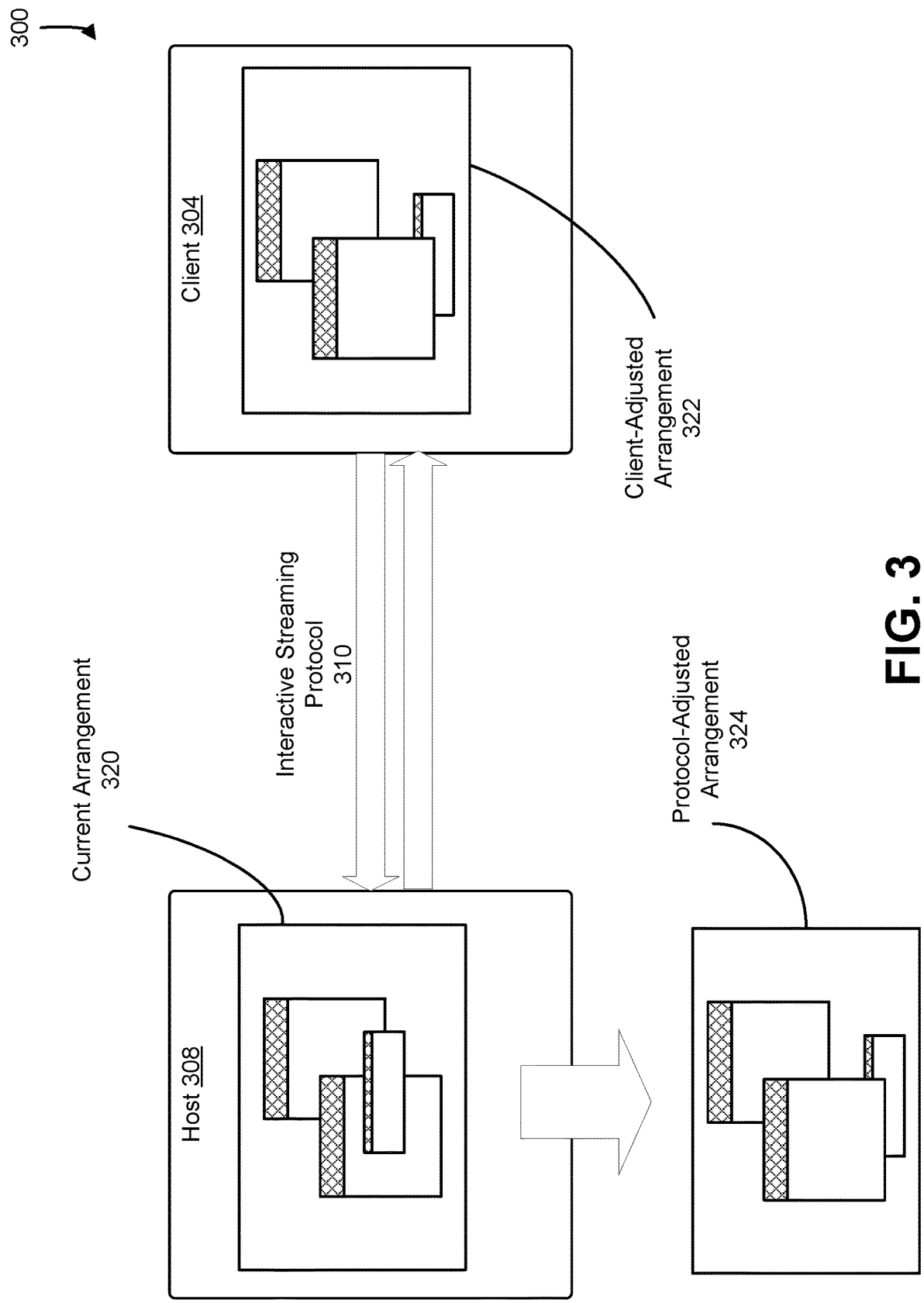
FIG. 3 illustrates an example of conforming desktop size and application window arrangement, in accordance with an embodiment.

FIG. 3 illustrates an example of conforming desktop size and application window arrangement, in accordance with an embodiment. In the example 300, the arrangement of windows in a desktop of a client 304 is coordinated with the arrangement of windows in a desktop of a host 308, and vice-versa.

In an embodiment, the coordination is performed via an interactive streaming protocol 310. The interactive streaming protocol 310 comprises two-way communications between the client 304 and the host 308. In some cases and embodiments, the correlated adjustments are made using an asynchronous approach, in which an adjustment (such as moving a window) is made in one side, and then asynchronously adjusted in the other. In other cases and embodiments, the correlated adjustments are made using a synchronous approach. Using the synchronous approach, the correlated adjustments are made while an action, such as moving a window, is underway.

In an example, a host 308 may have a current arrangement of windows 320. As a result of some interaction on the client 304, the arrangement of windows on the client 304 may be adjusted. For example, the user of the client device 304 might move a window to arrive at the client-adjusted arrangement 322 depicted in FIG. 3.

A component of the client, such as the client kernel 120 depicted in FIG. 1, may detect the change and send a message consistent with the interactive streaming protocol 310 to the host 308. On the host 308, a component such as the remoting control 126 may cause the host's arrangement of the windows to be coordinated with that of the new arrangement 322 of the client. In FIG. 3, the resulting arrangement is depicted as the protocol-adjusted arrangement 324.

In cases and embodiments, the interactive streaming protocol 310 comprises support for messages to respond to various window-positioning events that may occur on the client 304 and host 308.

In an embodiment, the interactive streaming protocol 310 comprises support for a message to indicate that the stack order of a window has been adjusted.

In an embodiment, the interactive streaming protocol 310 comprises support for a message to indicate that a window has been resized.

In an embodiment, the interactive streaming protocol 310 comprises support for a message to indicate that a window has moved.

In an embodiment, the interactive streaming protocol 310 comprises support for a message to indicate that a window has closed.

In an embodiment, the interactive streaming protocol 310 comprises support for a message to indicate that an application has opened a new window. Similarly, the interactive streaming protocol 310 may comprise support for a message to indicate that a new application window should be opened.

In an embodiment, the interactive streaming protocol 310 comprises support for a message to indicate that a window is in the process of being moved or resized.

In an embodiment, the interactive streaming protocol 310 comprises support for a message to indicate that an application has resized a window.

The various messages of the interactive streaming protocol may, depending on circumstances, be generated by the host 308 and sent to the client 304, or generated by the client 304 and sent to the host 308. In various embodiments, a gateway, such as the gateway depicted in FIG. 1, may act as an intermediary in the transmission of these messages.

Figure 4:
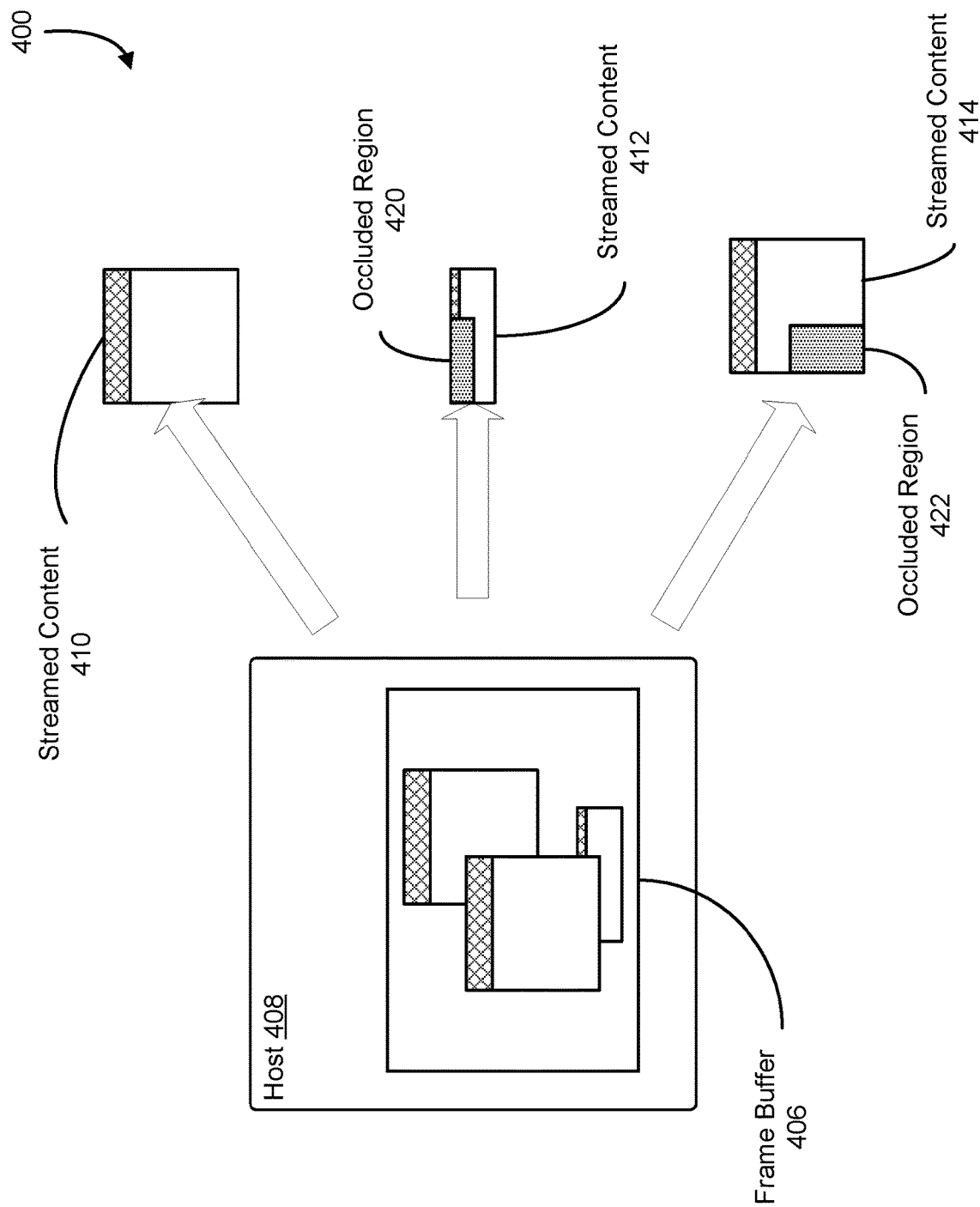
FIG. 4 illustrates an example of generating content streams for remoted application windows, in accordance with an embodiment.

FIG. 4 illustrates an example of generating content streams for remoted application windows, in accordance with an embodiment. As depicted in the example 400 of FIG. 4, a host 408 generates content for various application windows and stores the content in a frame buffer 406. As described herein, this content is generated in accordance with the coordinated arrangement of windows. Moreover, as a consequence of the coordination, the occluded regions of the windows on the host 408 correspond to the occluded regions of the corresponding client-side windows.

The frame buffer 406 may be a bitmap or other graphical representation of some or all of a desktop. As depicted in FIG. 4, the windows stored in the frame buffer 406 included several occluded regions. An occluded region of a window is a portion of the window that is obscured or overwritten by a window higher in the stack order. In various cases and embodiments, the host 408 does not generate content for the occluded regions, or content is generated for the occluded region, but overwritten by the host 408 with content generated for windows higher in the stack order.

Embodiments may stream content for the windows depicted in FIG. 4 as a single combined image. For example, in an embodiment the contents of frame buffer 406 are streamed as one image comprising the streamed content 410, 412, 414 for all of the host desktop windows. Other desktop data, such as the "background" image of the desktop, may be included or omitted, in various embodiments. Embodiments may also provide metadata describing the position and geometry of the various windows.

Some embodiments may stream content for individual windows based on the single frame buffer 406. In embodiments, the streamed content 410 for a window with no occluded regions is read from the frame buffer 406 and sent to a client device via a remoting protocol. Embodiments may also provide metadata describing the position and geometry of the window. For windows with occluded regions 420, 422, the streamed content 412, 414 can include placeholder content that is generated by the remoting system, although various embodiments will not generate such content. For example, in the system 100 of FIG. 1, the client kernel 120 might generate artificial content to fill-in an occluded region 422 of a window. The streamed content 414 for the window might therefore comprise data for the non-occluded portion that is obtained from the frame buffer 406 of the host, and placeholder content generated by a client kernel 120.

In embodiments, the placeholder content is generated to be relatively space-efficient. For example, the placeholder content might be of a uniform color or pattern which compresses easily. This content is typically not seen by the user, since it corresponds to an occluded, and therefore non-visible portion of the window. In some cases and embodiments, the placeholder content might be derived from the visible portion of the window, or retained from earlier data.

Figure 5:
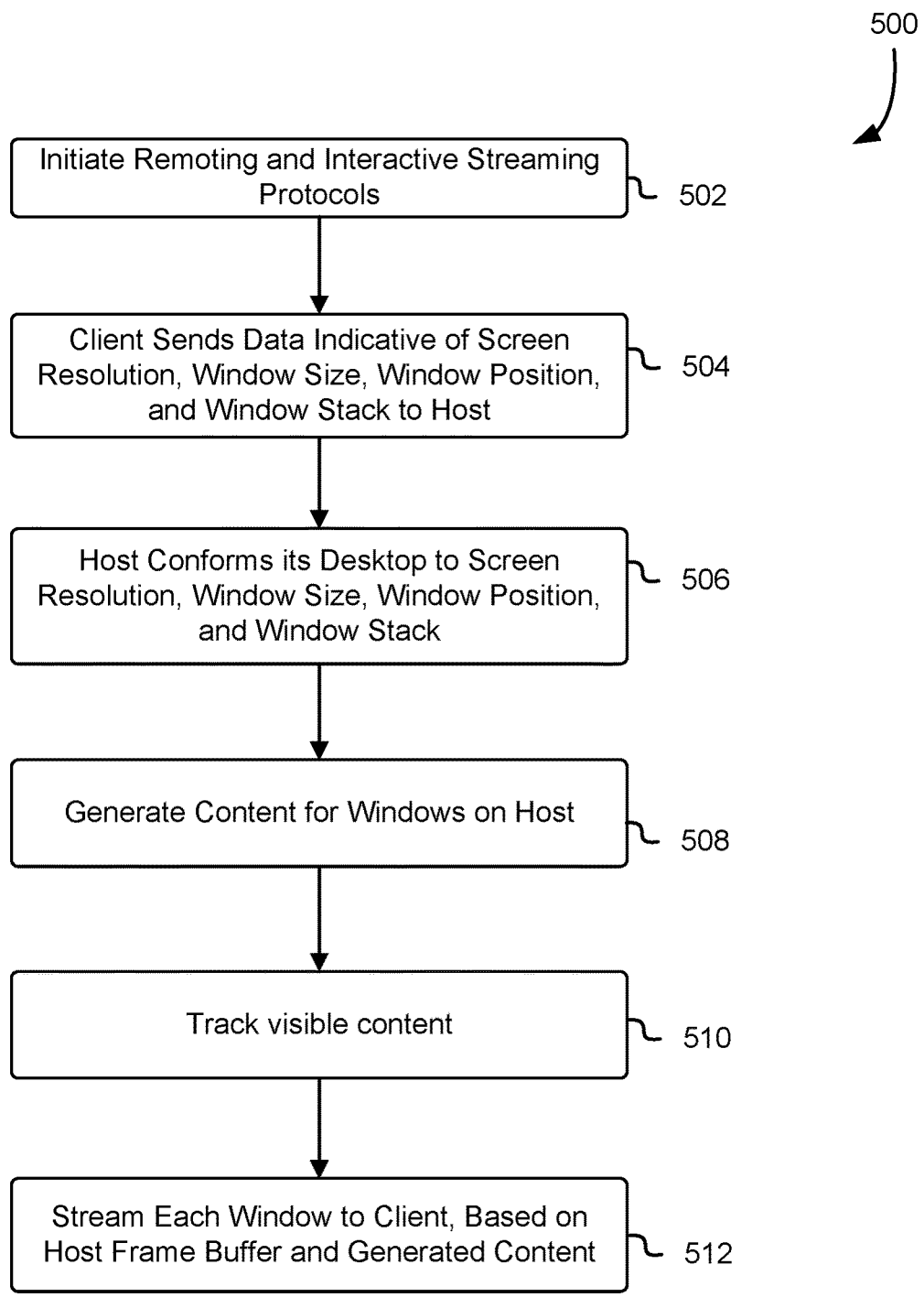
FIG. 5 illustrates an example procedure for remoting application windows, in accordance with an embodiment.

The aforementioned techniques and components may be further understood in view of FIG. 5, which illustrates an example procedure for remoting application windows, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

The steps and operations of the example process 500 may be performed by a system employing techniques and components operating in a manner consistent with the present disclosure. For example, the steps and operations of the example process 500 may be performed by the remoting system 100 depicted in FIG. 1. In an embodiment, the steps and operations are performed by the client kernel 120 of FIG. 1, or caused to be performed by another part of the system via the operation of the client kernel 120.

At 502, the system initiates remoting and interactive streaming protocols between a client and a remoting host. The remoting protocol may, for example, be a proprietary or open-source remote desktop protocol. The interactive streaming protocol, and depicted in FIG. 3, may be initiated by the system to facilitate coordination of desktop resolution and window arrangement between the host and client. For example, communications channels may be opened between the client device and a client kernel 120, and between a kernel and the host.

At 504, the system sends data indicative of screen resolution, window size, window position, and window stack data from the client to the host. Embodiments may communicate this information via the interactive streaming protocol.

At 506, the host conforms its desktop to the screen resolution of the client device, and conforms the arrangement of its windows to those of the client, including aspects of the arrangement such as window size, position, and stack order. The conforming of screen resolution and window arrangement continues on an ongoing basis, in order to ensure that the arrangement of windows is coordinated between the client and host.

At 508, content is generated for each host desktop window. In embodiments, this content is stored in a single frame buffer, such that the frame buffer.

At 510, the system tracks visible content. Here, visible refers to whether or not a hypothetical viewer of the host desktop would be able to view the content, given the current arrangement of windows. For example, the system may track visible content by identifying non-occluded portions of the host desktop windows, or identifying the occluded portions and inferring that the remaining non-occluded portions can be considered visible.

At 512, the content for each window is streamed to the client, based on the content generated by the host. Embodiments may, for example, stream binary data representative of the host desktop image to the client. In some cases, the data may be streamed as a single image. This image comprises representations of all visible portions of the host desktop's windows, but excludes representations of non-visible portions, such as those that are occluded by other windows or the edge of the host desktop. This approach may reduce the amount of data that is transferred, since the non-visible portions of the windows are omitted. In various embodiments, portions of the desktop other than the windows is also omitted from the stream.

Some embodiments may combine the data obtained from the host's frame buffer, for the non-occluded portions of a window, with placeholder content generated to represent the occluded portions. For windows with occluded regions, the streamed content can include both the "real" data and artificial placeholder content. However, the placeholder content is not generally seen in the client's display, since it corresponds to occluded portions of the window. Embodiments that generate placeholder content may do so to maintain compatibility with existing remoting protocols in which each window is streamed or processed separately. Other embodiments, however, will omit generating placeholder content.

Embodiments may stream metadata comprising information about the windows. For example, embodiments may stream a single image comprising representations of the visible (e.g., non-occluded) portions of a plurality of windows, and metadata describing the layout of the windows. The metadata may, for example, contain information describing the geometry of the non-occluded portions of the windows. The recipient of the metadata may use this information to extract the contents of a particular window from the image. Having extracting the content, the recipient may then surround the visible portion of the window with an appropriate border or frame, and display the window. This can be done in turn for each window, according to the stack order. The resulting display includes all visible content generated by the host.

Note that in various embodiments, the recipient of the data may customize the look-and-feel of the resulting windows. As just noted, the content of each window can be extracted from the steamed image, surrounded by a border or frame, and displayed. The style of the surrounding border or frame can be adjusted, as appropriate, to reflect the window style of the client desktop. For example, the recipient of the streamed data can use provided metadata to identify the location and geometry of the non-occluded portion of a particular window, extract the relevant data for that window, and display the content surrounded by a border or frame of the desired style.

Embodiments may employ similar techniques to stream the contents of the desktop windows separately. For example, data for each window can be extracted from the common frame buffer and streamed with metadata describing the position and content of each window. The metadata can be streamed independently, or combined with the stream for the respective window.

The process depicted in FIG. 5 may be implemented, in an embodiment, on a system comprising at least one processor and one or more memories comprising computer-executable instructions. The computer-executable instructions, when executed by the at least one processor, cause the system to at least obtain, from a client device, information indicative of a resolution of a desktop of the client device. Obtaining the resolution information can be accomplished, in various embodiments, by operating system calls which interface with a graphics subsystem of the client device. These calls may be initiated by a local process which executes on the client device, or by a remote process which causes the client device to execute the calls.

The computer-executable instructions, when executed by the at least one processor, further cause the system to at least obtain, from the client device, information indicative of a size, position, and stack order of a first window of the desktop of the client device, the first window to display content streamed from a hosted application. This information may also be obtained by the invocation of operating system calls on the client device. In embodiments, the invoked operating system calls interface with the windowing component of the operating system to retrieve the relevant information. It may be the case that only certain of the windows correspond to remoted applications. Accordingly, the system 100 may track remoted windows and limit the coordination process (between the client desktop and host desktop) to those windows.

The computer-executable instructions, when executed by the at least one processor, further cause the system to at least conform resolution of a desktop of a host device to the resolution of the desktop of the client device. This may be accomplished by invoking operating system calls of the host operating system, so that the host desktop is made to adopt a resolution which corresponds to that of the client desktop.

The computer-executable instructions, when executed by the at least one processor, further cause the system to at least cause the hosted application to display, on a desktop of the host device, a second window conforming to the size, position, and stack order of the first window. The host device therefore causes a second window, which corresponds to the first window on the client device, to adopt the same size, position, and stack order as the first window. This process may be repeated for each remoted window, so that the overall arrangement of hosted windows on the client desktop corresponds to the arrangement of windows on the host desktop. In particular, the arrangement is such that the occluded portions of the windows on the client desktop corresponds to the occluded portions of the windows on the host desktop. The system may cause the hosted application to display the window in the appropriate arrangement (including size, position, and stack order) by executing operating system commands which manipulate these properties, or which cause the application to manipulate these properties.

The computer-executable instructions, when executed by the at least one processor, further cause the system to at least stream, to the client device, content of the second window, wherein the streamed content is adjusted based at least in part on occlusion of the second window by other windows of the desktop of the host device. The adjusting of the stream content, in various embodiments, comprises the inclusion of placeholder content to represent occluded portions of the windows. As explained herein, the host system may not generate any content for the occluded portions. In the remoted stream of content, however, the system may include placeholder content for those regions of the windows that are occluded. By so doing, the system can provide an individual stream of content for each window.

In embodiments, the placeholder content is generated using a predefined pattern or color. The format of the placeholder content, in some cases and embodiments, may be selected so that it is space efficient, or so that it can be efficiently compressed.

As explained herein, the desktop of the client device may display a plurality of windows which correspond to the windows of applications executing on the host device. Each of the host windows may be made, through an interactive streaming protocol, to have a size, position, and stack order corresponding to those of the client device. The coordination process may be a two-way process, so that any adjustments made to window size, position, or stack order on the host device may be reflected on the client device, and vice versa.

The content of the windows may be streamed to the client device independently of other windows of the desktop of the host device. Each window may therefore be represented and manipulated as a distinct entity on the client device, thereby helping to provide a seamless mode of display and interaction for the hosted windows.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client computing device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server for receiving requests and serving content in response thereto, although for other networks an alternative device serving a similar purpose could be used as would be apparent to one of ordinary skill in the art. For example, in some embodiments a client computing device may communicate with other computing devices through various components of the network 604, such as routers and switches.

The client computing device 602 may operating as a remoting client. In an embodiment, the client device 104 of FIG. 1 is implemented on a device such as the client computing device 602 depicted in FIG. 6. The client computing device 602 may transmit requests, over the network 604, to initiate a remoting session. In some embodiments, the requests may be fielded by a web server, which may act as a gateway for the provision of remoting services. For example, the web server may identify an available application server 608, and assign to the application server 608 the task of hosting the remoting session. However, some embodiments may omit a web server or other gateway.

In an embodiment, the illustrative system includes at least one application server 608 and a data store 610 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content related to the hosted applications. Content transferred to a client device, in an embodiment, is processed by the client device to provide the content in one or more forms including, but not limited to, forms that are perceptible to the user audibly, visually and/or through other senses.

In an embodiment, the application server 608 hosts a remoting session within a virtual machine. The application server 608, in this embodiment, comprises a hypervisor which manages the instantiation, execution, suspension, and termination of virtual machines that may execute on the application server 608. The application server 608 and the associated hypervisor may assign a virtual machine to each remoting session. Each virtual machine may be associated with a plurality of applications and a plurality of associated application windows. Each virtual machine may implement a virtual desktop and associated frame buffer, in which graphical content for the application windows is stored.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto and the application server 608 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   one or more memories comprising computer-executable instructions that, in response to execution by the at least one processor, cause the system to at least:
      obtain, from a client device, information indicative of a resolution of a desktop of the client device;
      obtain, from the client device, information indicative of a size, position, and stack order of a first window of the desktop of the client device, the first window to display content streamed from a hosted application;
      adjust a resolution of a desktop of a host device to conform to the resolution of the desktop of the client device;
      cause the hosted application to generate, on a desktop of the host device, a second window conforming to the size, position, and stack order of the first window, wherein an occluded region of the second window corresponds to an occluded region of the first window; and
      stream, to the client device, content of the second window, the content excluding the occluded region of the second window.

2. The system of claim 1, wherein the desktop of the client device displays a first plurality of windows comprising the first window, and the desktop of the host device displays a second plurality of windows comprising the second window.

3. The system of claim 2, wherein each of the second plurality of windows has a size, position, and stack order corresponding to a window of the first plurality of windows.

4. The system of claim 1, wherein the client device displays the content of the second window in the first window, and wherein content of additional windows streamed from the desktop of the host device are displayed in additional windows of the client device.

5. The system of claim 1, wherein the one or more memories comprise further instructions that, when executed by the at least one processor, cause the system to at least:
send, to the client device, data indicative of a size and geometry of a visible portion of the second window.

6. A computer-implemented method, comprising:
receiving information indicative of a resolution of a desktop of a client;
receiving information indicative of an arrangement of a first window of the desktop of the client;
adjusting resolution of a desktop of a host to conform to the resolution of the desktop of the client;
causing an application executing on the host to arrange a second window in conformance to the arrangement of the first window, wherein an occluded region of the second window corresponds to an occluded region of the first window; and
streaming, to the client, content of the second window.

7. The method of claim 6, wherein a first plurality of windows displayed on a desktop of the client correspond to a second plurality of windows of a desktop of the host.

8. The method of claim 7, wherein each of the first plurality of windows has a size, position, and stack order corresponding to a window of the second plurality of windows.

9. The method of claim 6, further comprising:
streaming the content to the client by a desktop remoting protocol operating in seamless mode.

10. The method of claim 6, wherein the streamed content comprises a portion obtained from a frame buffer of the host, the portion corresponding to a non-occluded region of the second window.

11. The method of claim 6, wherein conforming a desktop of the host to the resolution of the desktop of the client comprises causing the visible portions of the first and second windows to be equivalent.

12. The method of claim 6, wherein content for a plurality of windows is stored in a first frame buffer associated with the desktop of the host, the plurality of windows comprising the second window.

13. A non-transitory computer-readable storage medium comprising executable instructions that, in response to execution by one or more processors of a computer system, cause the computer system to at least:
receive information indicative of a screen resolution of a desktop of a client device;
receive information indicative of an arrangement of a first window of the desktop of the client device;
cause an adjustment of a desktop of a host device to match the resolution of a desktop of the host device to the screen resolution of the desktop of the client device;
cause an application executing on the host device to arrange a second window in conformance to the arrangement of the first window, wherein an occluded region of the second window corresponds to an occlude region of the first window; and
send, to the client device, content of the second window, the content excluding the occluded region of the second window, wherein the client device displays the content of the second window in the first window independently.

14. The non-transitory computer-readable storage medium of claim 13, wherein a first plurality of windows displayed on a desktop of the client device correspond to a second plurality of windows of a desktop of the host device.

15. The non-transitory computer-readable storage medium of claim 14, wherein each of the first plurality of windows has a size, position, and stack order corresponding to a window of the second plurality of windows.

16. The non-transitory computer-readable storage medium of claim 13, wherein the non-transitory computer-readable storage medium comprises further instructions that, as a result of being executed by the one or more processors, cause the computer system to:
send the content to the client device, wherein content for an occluded portion of the second window is substituted with placeholder content.

17. The non-transitory computer-readable storage medium of claim 13, wherein the non-transitory computer-readable storage medium comprises further instructions that, as a result of being executed by the one or more processors, cause the computer system to:
receive, from a frame buffer, content for non-occluded portions of the second window and other windows of the desktop of the host device.

18. The non-transitory computer-readable storage medium of claim 13, wherein the occluded portions of the first window corresponds to the occluded portions of the second window.

19. The non-transitory computer-readable storage medium of claim 13, wherein content for a plurality of windows is stored in a first frame buffer associated with the desktop of the host device, the plurality of windows comprising the second window.

20. The method of claim 6, wherein the content is stored in a single frame buffer.

* * * * *